US008422072B2

(12) United States Patent
Okamoto et al.

(10) Patent No.: US 8,422,072 B2
(45) Date of Patent: Apr. 16, 2013

(54) IMAGE FORMING SYSTEM AND A SHEET PROCESSING APPARATUS THEREOF THAT COMMUNICATES CONFIGURATION INFORMATION TO AN IMAGE FORMING APPARATUS THEREOF

(75) Inventors: Kiyoshi Okamoto, Moriya (JP); Takuya Hayakawa, Toride (JP); Noriaki Matsui, Abiko (JP)

(73) Assignee: Canon Kabushiki Kaisha (JP)

( * ) Notice: Subject to any disclaimer, the term of this patent is extended or adjusted under 35 U.S.C. 154(b) by 720 days.

(21) Appl. No.: 12/509,773

(22) Filed: Jul. 27, 2009

(65) Prior Publication Data

US 2010/0027039 A1 Feb. 4, 2010

(30) Foreign Application Priority Data

Jul. 31, 2008 (JP) ................................. 2008-198558

(51) Int. Cl.
*H04N 1/60* (2006.01)
*G03G 15/00* (2006.01)

(52) U.S. Cl.
USPC .............. 358/1.9; 358/1.15; 358/1.7; 399/75; 399/76; 399/81

(58) Field of Classification Search ..................... 399/76
See application file for complete search history.

(56) References Cited

U.S. PATENT DOCUMENTS

| | | | | |
|---|---|---|---|---|
| 7,593,660 | B2 * | 9/2009 | Junichi | 399/75 |
| 2007/0086045 | A1 | 4/2007 | Nishikata et al. | |
| 2007/0253723 | A1 * | 11/2007 | Fujii et al. | 399/75 |
| 2008/0019725 | A1 * | 1/2008 | Iida et al. | 399/75 |
| 2008/0063422 | A1 | 3/2008 | Iida | |

FOREIGN PATENT DOCUMENTS

| | | | |
|---|---|---|---|
| CN | 1929540 | A | 3/2007 |
| JP | 2006-23611 | A | 1/2006 |
| JP | 2006259139 | A | 9/2006 |
| JP | 2008-90274 | A | 4/2008 |

OTHER PUBLICATIONS

Notification of Second Office Action for corresponding CN 200910161712.0, dated Mar. 29, 2012. English translation provided.

* cited by examiner

*Primary Examiner* — Twyler Haskins
*Assistant Examiner* — Christopher D Wait
(74) *Attorney, Agent, or Firm* — Rossi, Kimms & McDowell LLP

(57) ABSTRACT

An image forming system capable of shortening the time required to process configuration information on an image forming system and shortening communication time. When any of sheet processing apparatuses is activated before activation of an image forming apparatus, a controller of a sheet processing apparatus acting as a sub-manager configures a sub-system consisting of sheet processing apparatuses connected to a communication network and creates configuration data on the sub-system. When recognizing that the image forming apparatus is newly connected to the network, the sub-manager apparatus notifies the image forming apparatus of the already created configuration data based on which a controller of the image forming apparatus creates configuration data on the system and stores it into a RAM.

9 Claims, 17 Drawing Sheets

FIG. 5

| APPARATUS TYPE | BOOKBINDER | FOLDER | SHEET FEEDER | SHEET STACKER | FINISHER | CONTROLLER |
|---|---|---|---|---|---|---|
| APPARATUS TYPE ID | 31 | 41 | 51 | 21 | 11 | 1 |

FIG. 6

2001

| | |
|---|---|
| 1 | COMMAND ID: (CONNECTION START) |
| 2 | TRANSMISSION DESTINATION APPARATUS ID:00(ALL) |
| 3 | TRANSMISSION SOURCE APPARATUS SERIAL ID: |
| 4 | APPARATUS TYPE ID: |

FIG. 7

2002

| | |
|---|---|
| 1 | COMMAND ID: (CONNECTION PERMISSION) |
| 2 | TRANSMISSION DESTINATION APPARATUS SERIAL ID: |
| 3 | TRANSMISSION SOURCE NETWORK ID: |
| 4 | TRANSMISSION DESTINATION NETWORK ID: |

FIG. 8

2003

| | |
|---|---|
| 1 | COMMAND ID: (SUB-MANAGER TRANSFER ACCEPTANCE REQUEST) |
| 2 | TRANSMISSION DESTINATION APPARATUS SERIAL ID: |
| 3 | TRANSMISSION SOURCE NETWORK ID: |
| 4 | TRANSMISSION DESTINATION NETWORK ID: |
| 5 | NUMBER OF APPARATUSES CONNECTED TO SUB-SYSTEM: |
| 6 | APPARATUS TYPE ID OF FIRST APPARATUS IN SUB-SYSTEM: |
| : | : |
| B | NETWORK ID OF FIRST APPARATUS IN SUB-SYSTEM: |
| : | : |

FIG. 9

2004

| | |
|---|---|
| 1 | COMMAND ID: (SUB-MANAGER TRANSFER RESPONSE) |
| 2 | TRANSMISSION DESTINATION NETWORK ID: |
| 3 | TRANSMISSION SOURCE NETWORK ID: |
| 4 | SUB-MANAGER TRANSFER RESULT:(OK,NG) |

FIG. 10

2010

| | |
|---|---|
| 1 | COMMAND ID: (CONFIGURATION DATA REQUEST) |
| 2 | TRANSMISSION DESTINATION NETWORK ID: |
| 3 | TRANSMISSION SOURCE NETWORK ID: |
| 4 | CONFIGURATION INFORMATION REQUEST DESIGNATION: |

FIG. 11

2011

| | |
|---|---|
| 1 | COMMAND ID: (CONFIGURATION DATA REQUEST) |
| 2 | TRANSMISSION DESTINATION NETWORK ID: |
| 3 | TRANSMISSION SOURCE NETWORK ID: |
| 4 | |

FIG. 12

2101

| | |
|---|---|
| 1 | COMMAND ID: (IMAGE SYSTEM CONNECTION START) |
| 2 | TRANSMISSION DESTINATION APPARATUS ID:00(ALL) |
| 3 | TRANSMISSION SOURCE APPARATUS SERIAL ID: |
| 4 | APPARATUS TYPE ID: |

FIG. 13

2102

| | |
|---|---|
| 1 | COMMAND ID: (IMAGE SYSTEM CONNECTION PERMISSION) |
| 2 | TRANSMISSION DESTINATION APPARATUS SERIAL ID: |
| 3 | TRANSMISSION SOURCE NETWORK ID: |
| 4 | TRANSMISSION DESTINATION NETWORK ID: |
| 5 | NUMBER OF APPARATUSES CONNECTED TO SUB-SYSTEM: |
| 6 | APPARATUS TYPE ID OF FIRST APPARATUS IN SUB-SYSTEM: |
| : | : |
| B | NETWORK ID OF FIRST APPARATUS IN SUB-SYSTEM: |
| : | : |

*FIG. 14*

2020

| | |
|---|---|
| 1 | COMMAND ID: (CONFIGURATION DATA ACK) |
| 2 | TRANSMISSION DESTINATION NETWORK ID: |
| 3 | TRANSMISSION SOURCE NETWORK ID: |
| 4 | |
| 5 | |
| 6 | APPARATUS TYPE: (POST-PROCESSING APPARATUS) |
| 7 | POST-PROCESSING FUNCTION:(PUNCHING, STAPLE 1, STAPLE 2, STAPLE 3) |
| 8 | |
| 9 | CORRESPONDING MINIMUM SIZE: |
| 10 | CORRESPONDING MAXIMUM SIZE: |
| 11 | CORRESPONDING MATERIAL: |
| 12 | : |
| 13 | CORRESPONDING MINIMUM SPEED:mm/sec |
| 14 | CORRESPONDING MAXIMUM SPEED:mm/sec |
| 15 | NUMBER OF SHEET DISCHARGE STAGES: |
| 16 | STATUS OF FIRST STAGE: |
| 17 | STACKING STATE IN FIRST STAGE: |
| : | : |
| N1 | STATUS OF E-SIXTH STAGE: |
| N1+1 | STACKING STATE IN E-SIXTH STAGE: |
| : | : |
| N2 | NUMBER OF FUNCTION MODULES: |
| N2+1 | TYPE OF FIRST FUNCTION MODULE: |
| N2+2 | DETAILS OF FIRST FUNCTION MODULE: |
| N2+3 | PRESENCE/ABSENCE OF FIRST FUNCTION MODULE: (PRESENCE, ABSENCE) |
| N2+4 | STATUS OF FIRST FUNCTION MODULE:(OK,NG) |
| : | : |
| N3 | TYPE OF C-TH FUNCTION MODULE: |
| N3+1 | DETAILS OF C-TH FUNCTION MODULE: |
| : | : |

*FIG. 15A*

2021

| | |
|---|---|
| 1 | COMMAND ID: (CONFIGURATION DATA ACK) |
| 2 | TRANSMISSION DESTINATION NETWORK ID: |
| 3 | TRANSMISSION SOURCE NETWORK ID: |
| 4 | NUMBER OF APPARATUSES CONNECTED TO SUB-SYSTEM: |
| 5 | |
| N | APPARATUS TYPE ID:11 |
| N+1 | APPARATUS TYPE: (POST-PROCESSING APPARATUS) |
| N+2 | POST-PROCESSING FUNCTION:(PUNCHING, STAPLE 1, STAPLE 2, STAPLE 3) |
| N+3 | |
| N+4 | CORRESPONDING MINIMUM SIZE: |
| N+5 | CORRESPONDING MAXIMUM SIZE: |
| N+6 | CORRESPONDING MATERIAL: |
| : | : |
| N+20 | CORRESPONDING MINIMUM SPEED:mm/sec |
| N+21 | CORRESPONDING MAXIMUM SPEED:mm/sec |
| N+22 | NUMBER OF SHEET DISCHARGE STAGES: |
| N+23 | STATUS OF FIRST STAGE: |
| N+24 | STACKING STATE IN FIRST STAGE: |
| : | : |
| N1 | STATUS OF E-SIXTH STAGE: |
| N1+1 | STACKING STATE IN E-SIXTH STAGE: |
| : | : |
| N2 | NUMBER OF FUNCTION MODULES: |
| N2+1 | TYPE OF FIRST FUNCTION MODULE: |
| N2+2 | DETAILS OF FIRST FUNCTION MODULE: |
| N2+3 | PRESENCE/ABSENCE OF FIRST FUNCTION MODULE: |
| N2+4 | STATUS OF FIRST FUNCTION MODULE: |
| : | : |
| N3 | TYPE OF E-ELEVENTH FUNCTION MODULE: |
| N3+1 | DETAILS OF E-ELEVENTH FUNCTION MODULE: |
| : | : |

*FIG. 15B*

2021

| | |
|---|---|
| M | APPARATUS ID:51 |
| M+1 | APPARATUS TYPE: (SHEET FEEDER) |
| M+2 | CORRESPONDING MINIMUM SIZE: |
| M+3 | CORRESPONDING MAXIMUM SIZE: |
| M+4 | CORRESPONDING MATERIAL: |
| : | : |
| M+20 | CORRESPONDING MINIMUM SPEED:mm/sec |
| M+21 | CORRESPONDING MAXIMUM SPEED:mm/sec |
| M+22 | NUMBER OF SHEET FEED STAGES: |
| M+23 | STATUS OF FIRST STAGE: |
| M+24 | REMAINING SHEET AMOUNT IN FIRST STAGE: |
| M+25 | SHEET SIZE IN FIRST STAGE: |
| M+26 | STATUS OF FUNCTION MODULE IN FIRST STAGE: |
| M+27 | PRESENCE/ABSENCE OF FUNCTION MODULE IN FIRST STAGE: |
| M+28 | TYPE OF FUNCTION MODULE IN FIRST STAGE: |
| : | : |
| M1 | STATUS OF SECOND STAGE: |
| M1+1 | REMAINING SHEET AMOUNT IN SECOND STAGE: |
| : | : |
| M2 | STATUS OF D-SIXTH STAGE: |
| M2+1 | REMAINING SHEET AMOUNT IN D-SIXTH STAGE: |
| : | : |
| L | |
| L+1 | |
| L+2 | |
| L+3 | |

IMAGE FORMING SYSTEM AND A SHEET PROCESSING APPARATUS THEREOF THAT COMMUNICATES CONFIGURATION INFORMATION TO AN IMAGE FORMING APPARATUS THEREOF

BACKGROUND OF THE INVENTION

1. Field of the Invention

The present invention relates to an image forming system including an image forming apparatus and sheet processing apparatuses, and relates to a sheet processing apparatus.

2. Description of the Related Art

Conventionally, there has been known an image forming system having post-processing apparatuses such as a finisher which are coupled with an image forming apparatus, e.g., a copier, to achieve various post-processing desired by a user. For a business operation called POD (print-on demand) to print a desired number of sets of prints when needed, such an apparatus is desired which is suitable for fast and diversified small quantity production, i.e., which does not need to make preparation of printing-plate, adjustment or setting of book-binder, and other preparation at change in types of prints.

By using an image forming apparatus in combination with apparatuses dedicated to post-processing, it is possible to rapidly output various products desired by a user (e.g., book-bound sheet bundles, processed sheets, etc.). As the post-processing, there may be mentioned punching, sheet bundle discharging, stitching, folding, bookbinding, gluing, lapping, sorting, inserting, etc.

There has also been proposed an image forming apparatus capable of being activated simply by initializing a basic part thereof, while deciding the configuration of an image forming system based on system information stored in a nonvolatile memory, without confirming connection states of post-processing apparatuses upon activation of the image forming apparatus (see, Japanese Laid-open Patent Publication No. 2006-23611). With this image forming apparatus, a system activation time can be shortened.

However, these conventional image forming systems entail the following problems. Specifically, the POD system for diversified small quantity production needs to frequently change its configuration to attain the optimum system arrangement that varies depending on the type of job. Therefore, it takes much time including communication time to process configuration information, resulting in increase of a user's waiting time at activation of the system.

If the configuration of an image forming system is decided based on system information stored in a nonvolatile memory, without confirming states of connection between post-processing apparatuses and the image forming apparatus at the turn-on of power supply, as disclosed in Japanese Laid-open Patent Publication No. 2006-23611, problems are caused that it becomes difficult to deal with configuration information details such as a sequence alteration between the post-processing apparatuses and the presence/absence of and/or positions of an option tray, dolly, adapter and cartridge in the post-processing apparatuses.

Japanese Laid-open Patent Publication No. 2008-090274 discloses an image forming system, in which a downstream-most option peripheral device transmits option configuration information (initial information) to an upstream option peripheral device that adds its own option configuration information to the configuration information received from the downstream-most device and transmits the resultant option configuration information to a further upstream option device or an image forming apparatus. With this system, however, if each of the option devices has its power source configured to be singly and independently turned on/off by a user, it takes much time to grasp the configuration of the image forming system unless the user turns on the power sources of the option devices in sequence from the downstream-most device to the upstream-most device.

SUMMARY OF THE INVENTION

The present invention provides an image forming system capable of shortening a time required to process configuration information on the system and shortening a communication time, and provides a sheet processing apparatus for the system.

According to a first aspect of this invention, there is provided an image forming system comprising an image forming apparatus configured to form an image on a sheet, first and second sheet processing apparatuses each configured to process a sheet on which an image has been formed by the image forming apparatus, a communication unit configured to transmit configuration information on the first and second sheet processing apparatuses from the first or second sheet processing apparatus to the image forming apparatus, and a control unit configured to control whether the configuration information on the first and second sheet processing apparatuses is transmitted to the image forming apparatus from the first processing apparatus after configuration information on the second sheet processing apparatus has been transmitted to the first sheet processing apparatus or from the second sheet processing apparatus after configuration information on the first sheet processing apparatus has been transmitted to the second sheet processing apparatus.

According to the image forming system of this invention, configuration information on the system is created based on configuration information on a sub-system (sheet processing apparatuses) notified via a communication network, and therefore, time required to process the configuration information on the system and communication time can be shortened. Accordingly, the image forming system can be activated rapidly and the user's waiting time can be shortened. In addition, it is possible to effectively deal with frequent configuration changes and configuration information details of the sheet processing apparatuses.

According to a second aspect of this invention, there is provided a sheet processing apparatus comprising a communication unit configured to communicate with an image forming apparatus and a second sheet processing apparatus, and a control unit configured to determine whether it has received a command from the second sheet processing apparatus before elapse of a predetermined time from turn-on of power supply of the sheet processing apparatus to thereby determine whether configuration information on the sheet processing apparatus and the second sheet processing apparatus is transmitted from the sheet processing apparatus to the image forming apparatus, the control unit being configured to transmit configuration information on the sheet processing apparatus to the second sheet processing apparatus in a case where it is determined that the configuration information on the sheet processing apparatus and the second sheet processing apparatus is not transmitted from sheet processing apparatus to the image forming apparatus and configured to transmit configuration information received from the second sheet processing apparatus and configuration information on the sheet processing apparatus to the image forming apparatus in a case where it is determined that the configuration information on the sheet processing apparatus and the second sheet processing apparatus is transmitted from sheet processing apparatus to the image forming apparatus.

According to a third aspect of this invention, there is provided an image forming system comprising an image forming apparatus configured to form an image on a sheet, and first and second sheet processing apparatuses each configured to process a sheet on which an image has been formed by the image forming apparatus, wherein the first sheet processing apparatus includes a communication unit configured to communicate with the image forming apparatus and the second sheet processing apparatus, and a control unit configured to determine whether it has received a command from the second sheet processing apparatus before elapse of a predetermine time from turn-on of power supply of the first sheet processing apparatus to thereby determine whether configuration information on the first and second sheet processing apparatuses is transmitted from the first sheet processing apparatus to the image forming apparatus, the control unit being configured to transmit configuration information on the first sheet processing apparatus to the second sheet processing apparatus in a case where it is determined that the configuration information on the first and second sheet processing apparatuses is not transmitted from the first sheet processing apparatus to the image forming apparatus and configured to transmit configuration information received from the second sheet processing apparatus and the configuration information on the first sheet processing apparatus to the image forming apparatus in a case where it is determined that the configuration information on said first and second sheet processing apparatuses is transmitted from the first sheet processing apparatus to the image forming apparatus.

According to a fourth aspect of this invention, there is provided an image forming system comprising an image forming apparatus configured to form an image on a sheet, and a plurality of sheet processing apparatuses each configured to process a sheet on which an image has been formed by the image forming apparatus, wherein each of the plurality of sheet processing apparatuses includes a communication unit configured to communicate with the image forming apparatus and other sheet processing apparatus in the plurality of sheet processing apparatuses, and a control unit configured to determine whether it has received a command from the other sheet processing apparatus before elapse of a predetermined time from turn-on of power supply of the sheet processing apparatus to thereby determine whether configuration information on the plurality of sheet processing apparatuses is transmitted from the sheet processing apparatus to the image forming apparatus, the control unit being configured to transmit configuration information on the sheet processing apparatus to the other sheet processing apparatus in a case where it is determined that the configuration information on the plurality of sheet processing apparatuses is not transmitted from the sheet processing apparatus to said image forming apparatus and configured to transmit configuration information received from the other sheet processing apparatus and configuration information on the sheet processing apparatus to the image forming apparatus in a case where it is determined that the configuration information on the plurality of sheet processing apparatuses is transmitted from the sheet processing apparatus to the image forming apparatus.

Further features of the present invention will become apparent from the following description of an exemplary embodiment with reference to the attached drawings.

BRIEF DESCRIPTION OF THE DRAWINGS

FIG. 5 is a table showing an example of apparatus type IDs;

FIG. 6 is a table showing an example of a network connection notification command transmitted from an apparatus newly connected to a network to other apparatuses at turn-on of power supply of the apparatus;

FIG. 7 is a table showing an example of a network connection response command transmitted from a sub-manager to the apparatus newly connected to the network;

FIG. 8 is a table showing an example of a sub-manager transfer acceptance request command transmitted from the sub-manager to the apparatus newly connected to the network;

FIG. 9 is a table showing a sub-manager transfer response command transmitted from the apparatus newly connected to the network;

FIG. 10 is a table showing a configuration information transmission request command transmitted from the sub-manager to apparatuses connected to the network;

FIG. 11 is a table showing a sub-system information transmission request command transmitted from the sub-manager to the previous sub-manager;

FIG. 12 is a table showing a network connection notification command transmitted from the image forming apparatus newly connected to the network to other apparatuses;

FIG. 13 is a table showing a network connection response command transmitted from the sub-manager to the image forming apparatus;

FIG. 14 is a table showing an apparatus configuration information response command transmitted to the sub-manager;

FIGS. 15A and 15B are a table showing a sub-system configuration information response command transmitted from the previous sub-manager;

DETAILED DESCRIPTION OF THE PREFERRED EMBODIMENT

The present invention will now be described in detail below with reference to the drawings showing a preferred embodiment thereof.

(Construction of Image Forming System)

Figure 1:
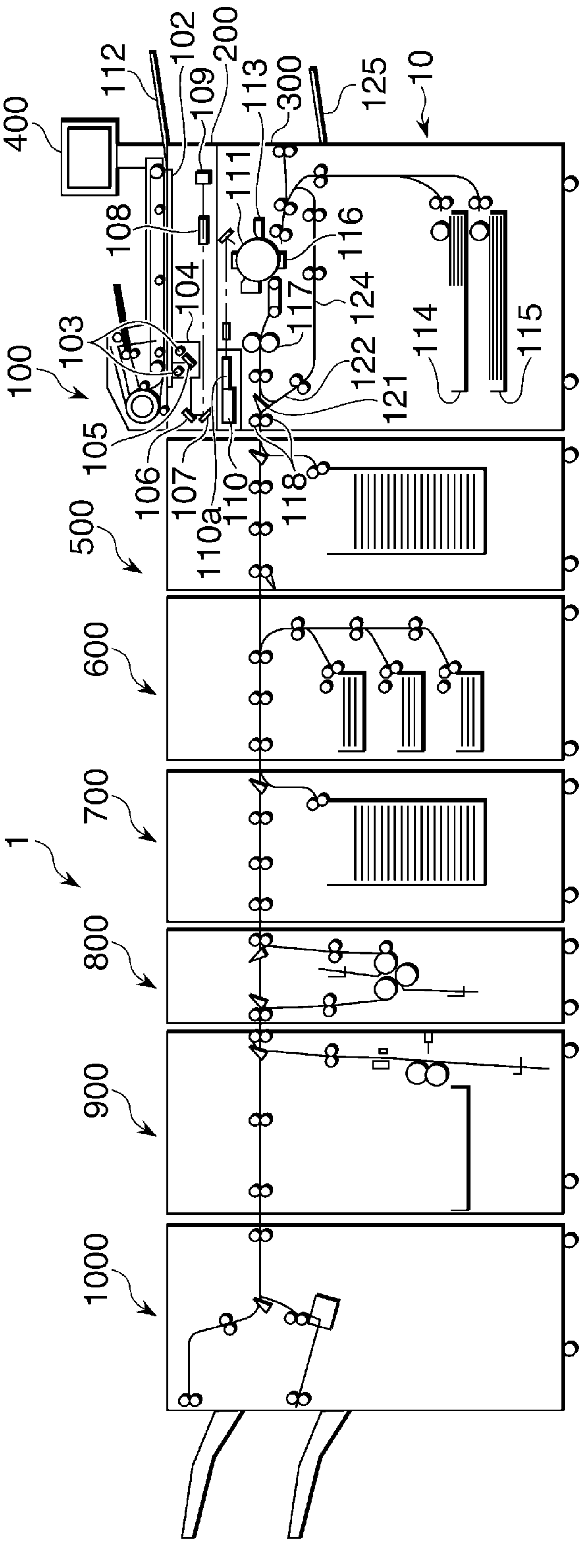
FIG. 1 is a section view showing the entire construction of an image forming system according to one embodiment of this invention.

FIG. 1 shows in cross section the entire construction of an image forming system 1 according to one embodiment of this invention. This system 1 includes an image forming apparatus 10, sheet stackers 500, 700, sheet feeder 600, folder 800, bookbinder 900, and finisher 1000. The image forming apparatus 10 includes an image reader 200, printer 300, and operation/display unit 400.

The image reader 200 is mounted with a document feeder 100 that feeds, one by one, originals set on a document tray with their front surfaces facing upward to the left in FIG. 1, conveys the originals along a curved path from the left to the right via a moving document reading position on a platen glass 102, and discharges the originals toward an external sheet discharge tray 112.

An image of the original is read by a scanner unit 104 held in a position corresponding to the moving original reading position when each original passes the moving original reading position on the platen glass 102. This reading method is generally called the moving original reading method. The image-formed surface of the original is illuminated by a lamp 103 of the scanner unit 104 when the original passes the moving original reading position, and the reflected light from the original is led via mirrors 105 to 107 to a lens 108 and focused on the imaging plane of an image sensor 109.

Assuming that the original conveyance direction is called the subscanning direction and a direction normal thereto is called the main scanning direction, the original image is read line by line in the main scanning direction by the image sensor 109 as the original is conveyed in the subscanning direction to pass the moving original reading position, whereby the whole original image is read. The optically read image is converted into image data by the sensor 109.

The image data output from the image sensor 109 is subjected to predetermined processing by an image signal controller 202, described later, and the processed image data is supplied as a video signal to an exposure controller 110 of the printer 300.

Alternatively, the original conveyed by the document feeder 100 onto the platen glass 102 may be stayed at a predetermined position on the platen glass 102, and in this state the original image may be read by scanning the scanner unit 104 from left to right. This method is called the stationary original reading method.

To read the original without using the document feeder 100, the document feeder 100 is raised by the user and the original is placed on the platen glass 102. Then, the scanner unit 104 is scanned from left to right to read the original, whereby the stationary original reading is performed.

The exposure controller 110 of the printer 300 modulates laser light according to the supplied video signal and outputs the modulated laser light, which is irradiated onto a photosensitive drum 111 while being scanned by a rotating polygon mirror 110*a*. An electrostatic latent image is formed on the photosensitive drum 111 according to the scanned laser light. At the stationary original reading, the exposure controller 110 outputs the laser light such as to form a correct image (not a mirror image).

The electrostatic latent image on the photosensitive drum 111 is visualized as a developer image by a developer supplied from a developing unit 113. In synchronism with laser light irradiation, a sheet is fed from a cassette 114 or 115 or a manual sheet feeder 125 or a double-sided conveyance path 124 and conveyed into between the photosensitive drum 111 and a transfer unit 116. The developer image formed on the drum 111 is transferred onto the sheet by the transfer unit 116.

The sheet on which the developer image has been transferred is conveyed to a fixing unit 117 that fixes the developer image onto the sheet with heat and pressure. The sheet having passed through the fixing unit 117 is discharged from the printer 300 to the external sheet stacker 500 via a flapper 121 and discharging rollers 118.

To discharge the sheet with the image-formed surface facing downward, the sheet having passed through the fixing unit 117 is guided into an inversion path 122 by a switching action of the flapper 121. When the trailing edge of the sheet passes through the flapper 121, the sheet is switched back and discharged by the discharging rollers 118 from the printer 300. This type of sheet discharging (sheet inverted discharging) is effected for successive formation from the top page of images when for example the images are read by the document feeder 100 or output from a computer. By the sheet inverted discharging, sheets are discharged in a correct order.

When hard sheets such as OHP sheets are fed from the manual sheet feeder 125 for image formation, these sheets are not guided into the inversion path 122 but discharged by the discharging rollers 118 with the image-formed surfaces facing upward.

If double-sided recording is selected to form images on both sides of a sheet, control is made such as to guide the sheet into the inversion path 122 by the switching action of the flapper 121, convey the sheet to the double-sided conveyance path 124, and refeed the sheet from the conveyance path 124 into between the photosensitive drum 111 and the transfer unit 116 in synchronism with laser light irradiation.

Sheets discharged from the printer 300 are conveyed to the sheet stacker 500 that performs sheet-stack processing. Sheets discharged from the printer 300 pass through the sheet stacker 500 and the sheet feeder 600, and are conveyed from the sheet feeder 600 to the sheet stacker 700 that performs sheet-stack processing.

When sheets discharged from the printer 300 pass through the sheet stacker 500, sheet feeder 600, and sheet stacker 700, the sheets passing through the stacker 700 are conveyed to the folder 800 that performs sheet folding processing and conveys the folded sheets toward the bookbinder 900.

When sheets discharged from the printer 300 pass through the sheet stacker 500, sheet feeder 600, sheet stacker 700, and folder 800, the sheets passing through the folder 800 are conveyed to the bookbinder 900 that performs bookbinding processing to gather the sheets into bundles and stacks the sheet bundles.

In a case that sheets discharged from the printer 300 pass through the sheet stacker 500, sheet feeder 600, sheet stacker 700, folder 800, and bookbinder 900, the sheets passing through the bookbinder 900 are conveyed to the finisher 1000 that performs stitching, punching, and other processing, and then discharges and stacks the processed sheets.

Figure 2:
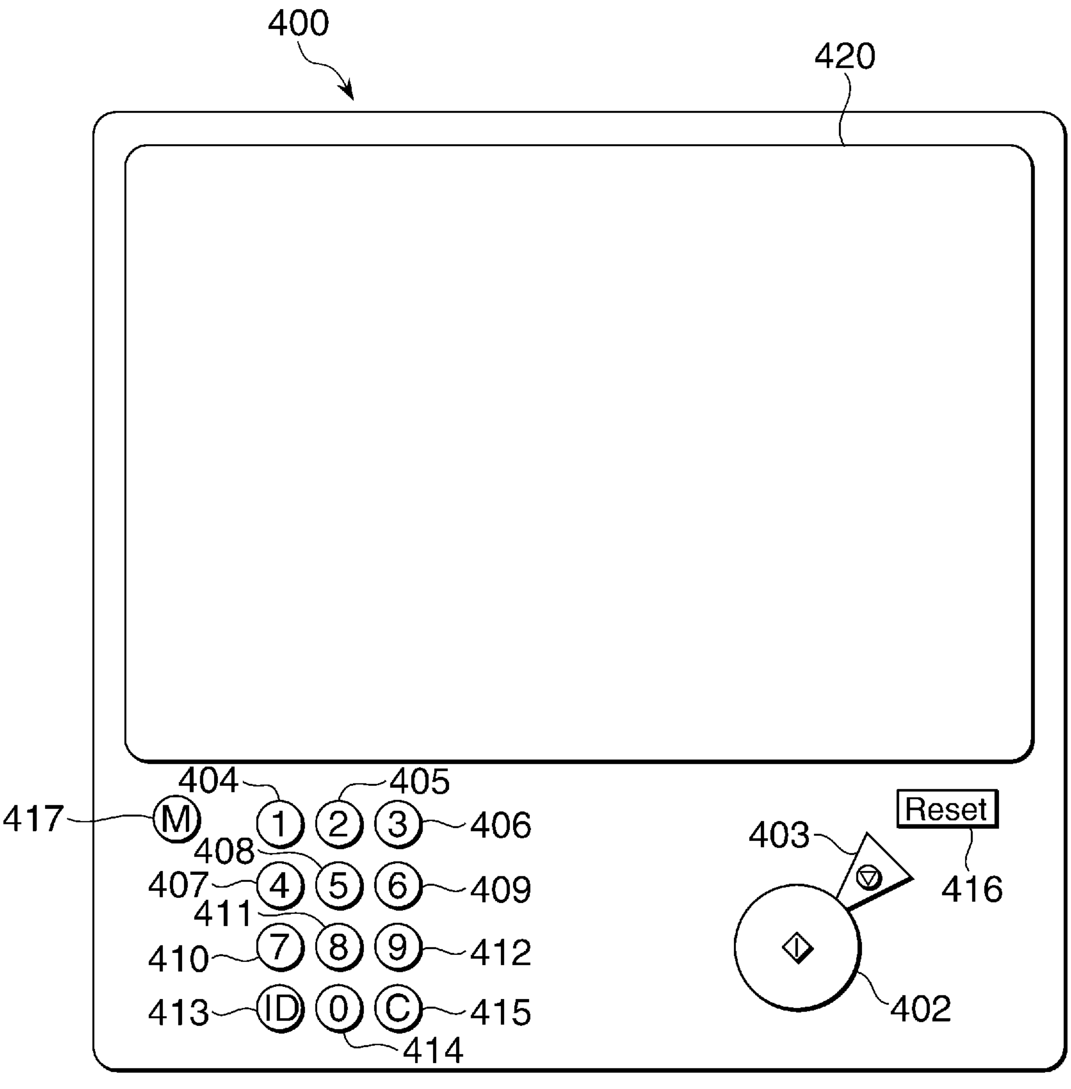
FIG. 2 is a front view showing the construction of an operation/display unit of an image forming apparatus of the image forming system.

FIG. 2 shows in front view the construction of the operation/display unit 400 on which there are disposed a start key 402 for starting an image forming operation, stop key 403 for stopping the image forming operation, ten keys 404 to 412 and 414 for numeric settings, ID key 413, clear key 415, reset key 416, and maintenance key 417.

The operation/display unit 400 is provided at its upper part with a liquid crystal display 420 with touch panel. Soft keys can be displayed on a screen of the display 420. As post-processing modes, there are a non-sort (group) mode, sort mode, staple sort mode (stitching mode), bookbinding mode, folding mode, punching mode, sheet insertion mode, and other processing modes. The settings of processing modes, etc. are made according to input manipulations on the operation/display unit 400. For example, when a soft key "post-processing" displayed on the display 420 is selected, a menu selection screen is displayed on the display 420 and a desired processing mode is set using the menu selection screen.

Figure 3:
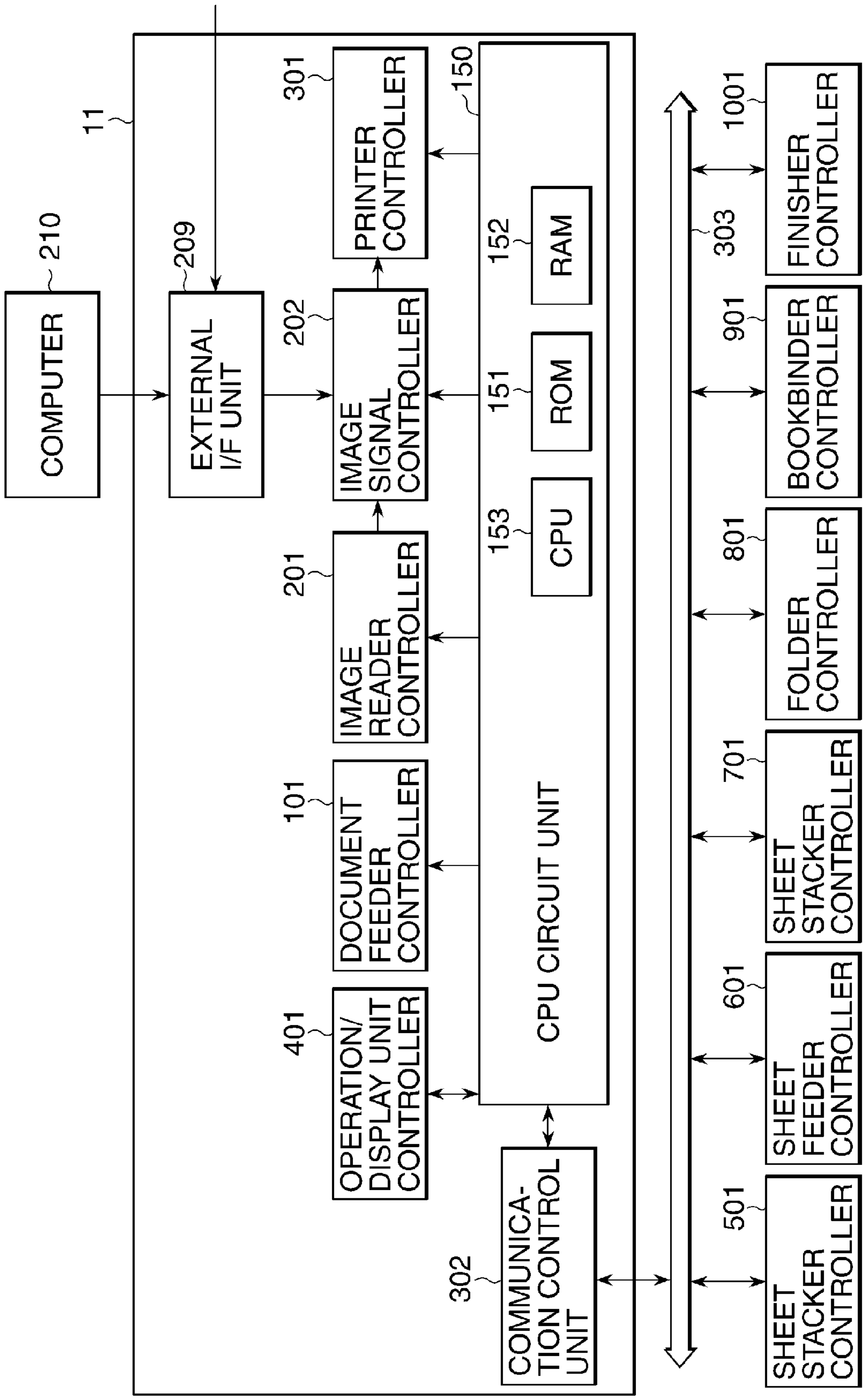
FIG. 3 is a block diagram showing the construction of a controller of the image forming apparatus, together with controllers of sheet processing apparatuses connected to the controller of the image forming apparatus.

Next, the construction of a controller 11 that controls the entire image forming system will be described. FIG. 3 shows in control block diagram the construction of the controller 11 of the image forming apparatus 11, together with controllers of sheet processing apparatuses (first and second sheet processing apparatuses) connected to the controller 11. The controller 11 (first control unit) includes a CPU circuit unit 150 in which a CPU 153, ROM 151, and RAM 152 are incorporated. The ROM 151 and the RAM 152 are connected with the CPU 153 via address bus and data bus. The CPU 153 executes a control program stored in the ROM 151, whereby the CPU circuit unit 150 performs overall control of blocks 101, 201, 202, 209, 301, 302, and 401.

The RAM 152 is implemented by a nonvolatile memory and holds storage contents even if power supply is shut off. The RAM 152 holds control data and is used as a work area for computation for the control. The RAM 152 (configuration information storage unit) stores configuration data for the image forming system, described later.

A document feeder controller 101 controls the drive of the document feeder 100 in accordance with instructions from the CPU circuit unit 150. An image reader controller 201 controls the drive of the scanner unit 104, image sensor 109, etc., and transfers an analog image signal output from the image sensor 109 to the image signal controller 202.

The image signal controller 202 performs various processing on an image signal from the image sensor 109 or an external I/F unit 209, and writes image data into a hard disk and a page memory implemented by, e.g., a DRAM in the image signal controller 202. The image signal controller 202 reads out an image and sends it to the external I/F unit 209 or a printer controller 301, and controls a function of developing and laying out original images on the page memory, a function of cutting and outputting part of images, and a function of image rotation. Image data stored in the hard disk are output in the order according to an edit mode specified by the operation/display unit 400.

The external I/F unit 209 captures via the image signal controller 202 image data read by the image reader controller 201, and outputs the captured image data to the outside of the image forming apparatus 10. The external I/F unit 209 captures image data from the outside of the image forming apparatus 10, and outputs via the image signal controller 202 the image data to the printer controller 301 that performs image formation. To this end, the external I/F unit 209 includes an interface for data communication with an external computer 210, local area network (LAN) interface, USB interface, serial I/F, SCSI interface, and Centronics I/F for input for printer data. The external I/F unit 209 further includes a modem as an interface for data communication with a facsimile machine, etc. via a public line.

An operation/display unit controller 401 exchanges information between the operation/display unit 400 and the CPU circuit unit 150. As described above, the operation/display unit 400 includes the keys 402 to 417 for setting various functions relating to image formation and the display 420 for displaying information representing a setting state. Key signals corresponding to key operations on the operation/display unit 400 are output to the CPU circuit unit 150 via the controller 401. In accordance with signals from the CPU circuit unit 150, the controller 401 controls the display 420 of the operation/display unit 400 to display information thereon.

A communication control unit 302 (communication unit, reception unit) controls data communication between the CPU circuit unit 150 and communication control units (communication units, notification units) of controllers (control units) of post-processing apparatuses independently connected to the controller 302 via a communication cable 303 (communication network). In this embodiment, the sheet processing apparatuses include the sheet stacker 500, sheet feeder 600, sheet stacker 700, folder 800, bookbinder 900, and finisher 1000 as previously described. The controller 11 of the image forming apparatus 10 includes a power supply unit (first power supply) for converting AC input into DC output and rectified AC output, and a power switch for activating the apparatus. The controller 11 can be activated singly and independently.

A sheet stacker controller 501 mounted on the sheet stacker 500 includes a CPU, a ROM, a RAM, I/Os for controlling sensors and motors, and a communication control unit, which respectively correspond to those of the controller 11. The controller 501 exchanges information with the communication control unit 302 of the controller 11 and with communication control units of the sheet feeder controller 601, sheet stacker controller 701, folder controller 801, bookbinder controller 901, and finisher controller 1001. Based on these information, the sheet stacker controller 501 controls the sheet stacker 500. The sheet stacker controller 501 includes a power supply unit (second power supply) for converting AC input into DC output and rectified AC output and a power switch for starting the apparatus 500, and is configured to be able to be singly and independently activated.

Each of the sheet feeder controller 601, sheet stacker controller 701, folder controller 801, bookbinder controller 901, and finisher controller 1001 is configured basically the same as the sheet stacker controller 501. Specifically, each of the controllers 601 to 1001 includes a CPU, ROM, RAM, I/Os for controlling sensors and motors, and communication control unit. Each of the controllers 601 to 1001 includes a power supply unit (second power supply) and a power switch, and is configured to be able to be independently activated.

The communication control unit of the sheet feeder controller 601 mounted on the sheet feeder 600 exchanges information with the communication control unit 302 of the controller 11 and with the communication control units of the controllers 501, 701, 801, 901 and 1001. Based on these information, the sheet feeder controller 601 controls the sheet feeder 600.

The communication control unit of the sheet stacker controller 701 mounted on the sheet stacker 700 exchanges information with the communication control units of the controllers 11, 501, 601, 801, 901 and 1001. Based on these information, the sheet stacker controller 701 controls the sheet stacker 700.

The communication control unit of the folder controller 801 mounted on the folder 800 exchanges information with the communication control units of the controllers 11, 501, 601, 701, 901 and 1001. Based on these information, the folder controller 801 controls the folder 800.

The communication control unit of the bookbinder controller 901 mounted on the bookbinder 900 exchanges information with the communication control units of the controllers 11, 501, 601, 701, 801 and 1001. Based on these information, the bookbinder controller 901 controls the bookbinder 900.

The communication control unit of the finisher controller 1001 mounted on the finisher 1000 exchanges information with the communication control units of the controllers 11 and 501 to 901. Based on these information, the finisher controller 1001 controls the finisher 1000.

(Constructions of Sheet Processing Apparatuses)

Figure 4:
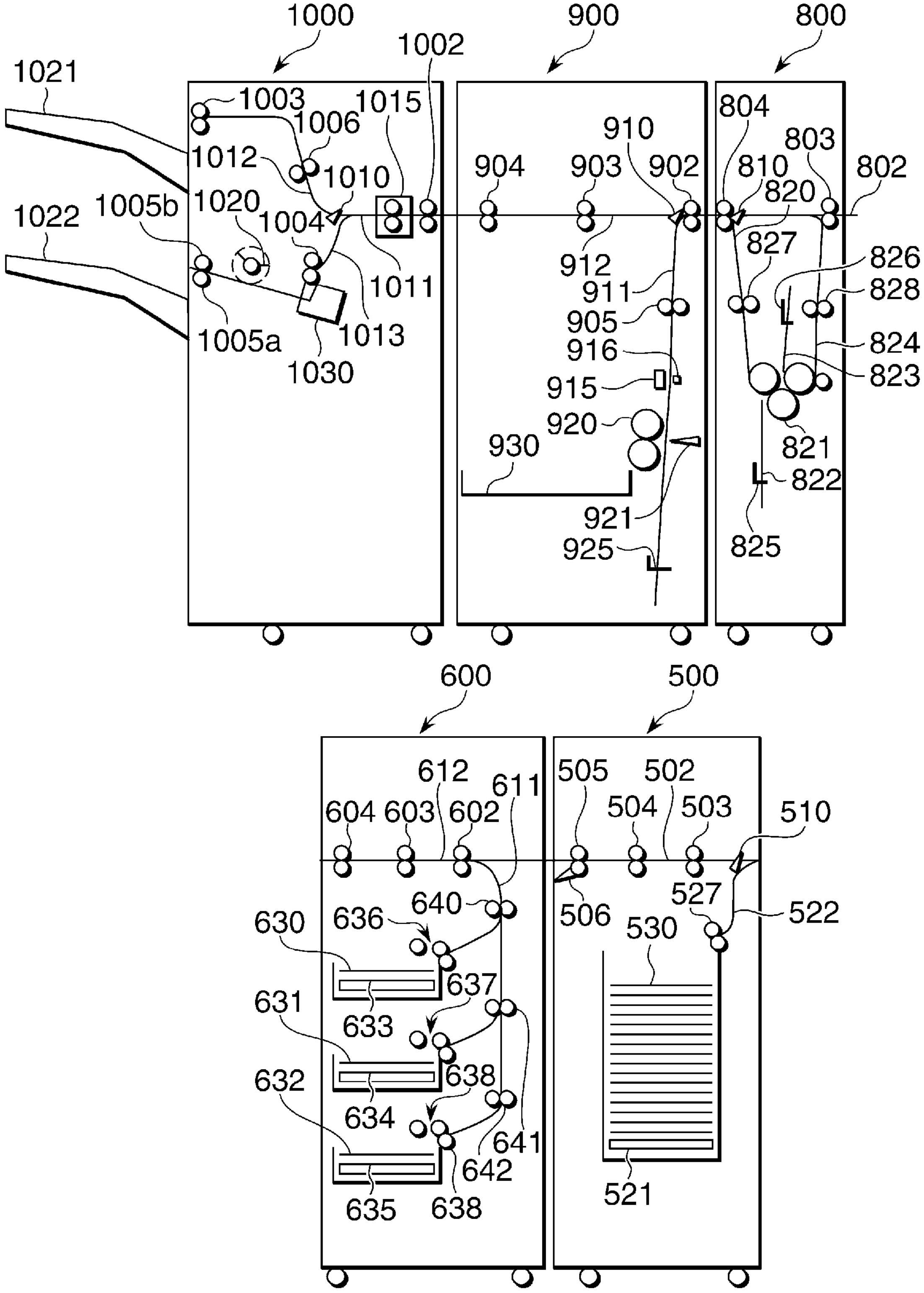
FIG. 4 is a section view showing the constructions of the sheet processing apparatuses.

With reference to FIG. 4, a description is given of the constructions of the sheet processing apparatuses, i.e., the sheet stackers 500, 700, sheet feeder 600, folder 800, bookbinder 900, and finisher 1000. FIG. 4 shows the constructions of the sheet processing apparatuses in section view. Since the sheet stackers 500, 700 are the same in construction, only the sheet stacker 500 is described below.

(Sheet Stacker)

The sheet stacker 500 includes a horizontal conveyance path 502 for introducing a sheet discharged from the printer 300 and guiding the sheet to a downstream post-processing apparatus. Conveyance roller pairs 503 to 505 are disposed along the conveyance path 502. At entrance of the conveyance path 502, there is disposed a path selection flapper 510 that performs a switching action for guiding a sheet on the horizontal conveyance path 502 to a vertically movable sheet stacking unit 530 or the sheet feeder 600.

To perform sheet stack processing, the path selection flapper 510 is made off, and sheets are introduced into a path 520 and then sequentially stacked one upon another on the sheet stacking unit 530. When the sheet stack processing is not performed, the path selection flapper 510 is made on, and sheets are conveyed from the printer 300 via the horizontal conveyance path 502 to the sheet feeder 600.

At exit of the horizontal conveyance path 502, a flapper 506 is disposed. If a jam or other failure takes place in a downstream post-processing apparatus and sheets cannot be conveyed to the post-processing apparatus, sheets being conveyed (processed) in the image forming system can be withdrawn by switching the flapper 506.

A dolly 521 is movable in a state where sheets are stacked on the sheet stacking unit 530. The sheet stacker 500 can be removably mounted with the dolly 521 and is configured to be able to detect a mounted/dismounted state of dolly and a mounted dolly type. Even if the dolly 521 is not disposed in the stacker 500, sheets can be stacked on the sheet stacking unit 530.

(Sheet Feeder)

The sheet feeder 600 includes a horizontal conveyance path 612 for introducing a sheet discharged from the printer 300 via the sheet stacker 500 and guiding it to a downstream post-processing apparatus, or for guiding a sheet fed from inside the sheet feeder 600 to the downstream post-processing apparatus. Conveyance roller pairs 602 to 604 are disposed along the conveyance path 612.

The sheet feeder 600 includes sheet housing units 630 to 632 having intermediate plates 633 to 635, respectively, on which sheets can be stacked. Sheets can be fed therefrom one by one by means of sheet feed separators 636 to 638, and introduced into the horizontal conveyance path 612 by corresponding ones of conveyance roller pairs 640 to 642 disposed along a vertical sheet feed path 611. The intermediate plates 633 to 635 are vertically moved according to an amount of sheets.

The sheet housing units 630 to 632 can each be removably mounted with, e.g., a tab sheet supply module for supplying and conveying a tab sheet, or a special sheet supply module having a heater and a separation/absorption fun or nozzle for supply and conveyance of a special type sheet. As the special type sheet, there may be mentioned, e.g., a coated sheet subjected to surface treatment, or a sheet subjected in advance to printing by other printing machine and then subjected to special surface treatment. The sheet housing units 630 to 632 are each configured to be able to detect a mounted/dismounted state of removable sheet supply module and a mounted module type.

(Folder)

The folder 800 includes a horizontal conveyance path 802 that introduces a sheet discharged from the printer 300 or fed from the sheet feeder 600 and guides the sheet to a downstream post-processing apparatus. Conveyance roller pairs 803, 804 are provided along the conveyance path 802. At exit of the conveyance path 802, there is provided a folder path selecting flapper 810 that performs a switching action for selectively guiding a sheet on the conveyance path 802 to a folder path 820 or the downstream post-processing apparatus.

To perform folding processing, the folder path selection flapper 810 is made on, and a sheet is introduced into a folder path 822 via the path 820 and conveyed until its leading end reaches a first folder stopper 825.

Subsequently, the sheet is guided to a folder path 823 by folder rollers 821 and folded at its portion located at a predetermined distance from its end, and then conveyed until the sheet end reaches a second folder stopper 826.

Further, the sheet is introduced into a folder path 824 by the folder rollers 821 and folded at its center part into a predetermined shape. On the other hand, when the folding processing is not performed, the folder path selection flapper 810 is made off and a sheet is directly conveyed from the printer 300 via the horizontal conveyance path 802 to the downstream post-processing apparatus.

The folder path 822 and the first folder stopper 825 constitute a removable lower folder module, and the folder path 823 and the second folder stopper 826 constitute a removable upper folder module. By combining desired upper and lower folder modules, the way of sheet folding can be changed according to the type of folding desired by the user. The folder 800 is configured to be able to detect mounted/dismounted states of upper and lower folder modules and a mounted module type.

(Bookbinder)

The bookbinder 900 includes a horizontal bookbinder path 912 for introducing a sheet discharged from the printer 300 or fed from the sheet feeder 600 and for guiding the sheet to a downstream post-processing apparatus. Conveyance roller pairs 902 to 904 are disposed along the bookbinder path 912. At entrance of the bookbinder path 912, there is provided a bookbinder path selection flapper 910 that performs a switching operation for guiding a sheet on the bookbinder path 912 to a bookbinder path 911 or the downstream post-processing apparatus.

To perform bookbinding processing, the bookbinder path selection flapper 910 is made on, and a sheet is introduced into the bookbinder path 911 and conveyed by a conveyance roller pair 905 until the sheet leading end is brought in contact with a movable sheet positioning member 925. Two staplers 915 disposed at intermediate positions along the path 911 cooperate with an anvil 916 to close a central part of a sheet bundle.

A pair of folding rollers 920 and a projection member 921 are disposed downstream of the staplers 915. By projecting the projection member 921 to the sheet bundle housed on the bookbinder path 911, the sheet bundle is pushed in between and folded by the folding rollers 920 and then discharged onto a discharge tray 930.

To fold the sheet bundle stapled by the staplers 915, the sheet positioning member 925 is moved downward by a predetermined distance after completion of staple processing, so that a staple position of the sheet bundle is set at a central position of the folding rollers 920.

On the other hand, when bookbinding processing is not performed, the bookbinder path selection flapper 910 is made off and a sheet is conveyed from the folder 800 to the downstream post-processing apparatus via the horizontal bookbinder path 912. The stapler 915, anvil 916, folding roller pair 920, sheet positioning member 925, and projection member 921 constitute a movable bookbinder module.

In the above, there has been described an example bookbinding operation performed by the bookbinding module with two staples. Alternatively, a bookbinding module with a trimmer function of cutting sheet edges for alignment after bookbinding can be removably mounted to the bookbinder 900. Further alternatively, the bookbinder 900 can be removably mounted with any other module suited to a type of bookbinding, such as a glue binding module that performs bookbinding by pressing a glued tape against a sheet bundle and heating them. The bookbinding module is configured to be able to detect a mounted/dismounted state of module and a mounted module type.

(Finisher)

The finisher 1000 includes a pair of entrance rollers 1002 for introducing a sheet discharged from the printer 300 or fed from the sheet feeder 600. The sheet conveyed by the roller pair 1002 is introduced into a finisher path 1011. A switching flapper 1010 disposed downstream of the finisher path 1011 is for introducing a sheet into a non-sort path 1012 or a sort path 1013.

To perform non-sort processing, the flapper 1010 is made on. A sheet is introduced into the non-sort path 1012 and discharged onto a sample tray 1021 by a conveyance roller pair 1006 and a non-sort discharge roller pair 1003 disposed along the non-sort path 1012.

On the other hand, when staple processing or sort processing is performed, the flapper 1010 is made off. Sheets introduced into the sort path 1013 are discharged by sort discharge rollers 1004 and stacked onto an intermediate tray 1030.

The sheets stacked in a bundle on the tray 1030 are discharged by discharge rollers 1005*a*, 1005 onto the stack tray 1022 after being subjected to alignment processing, staple processing, etc. as required. A stapler 1020 is used for the staple processing to bind together the sheets stacked in a bundle on the intermediate tray 1030. The stack tray 1022 is movable in a vertical direction.

The finisher 1000 is removably mounted with a punching module 1015 that performs punching processing on sheets. The module 1015 is replaced according to a type of punching desired by the user, e.g., the number of holes (two, three, four, twenty, thirty, etc.) and hole diameter. The finisher 1000 is configured to be able to detect a mounted/dismounted state of punching module and a mounted module type.

In the following, a description will be given of an operation of the image forming system 1 upon activation thereof. Specifically, there will be described an operation of the controller 11 of the image forming apparatus 10 upon activation thereof, in which the controller 11 utilizes sub-system configuration data notified from a post-processing apparatus in a sub-system for the preparation of configuration data for the image forming system, and stores the prepared configuration data into the RAM 152.

(Apparatus Type ID)

FIG. 5 is a table showing an example of apparatus type IDs. The table is stored in the ROM 151 of the CPU circuit unit 150. In this embodiment, the bookbinder 900, folder 800, sheet feeder 600, sheet stacker 700, finisher 1000, and controller 11 have their apparatus type IDs (inherent information, identification information), which are set to values of 31, 41, 51, 21, 11, and 1, respectively. The apparatus type ID has a smaller value with the increasing priority of apparatus. It should be noted that the apparatus type IDs can arbitrarily be set according to utilization form, etc.

Figure 16:
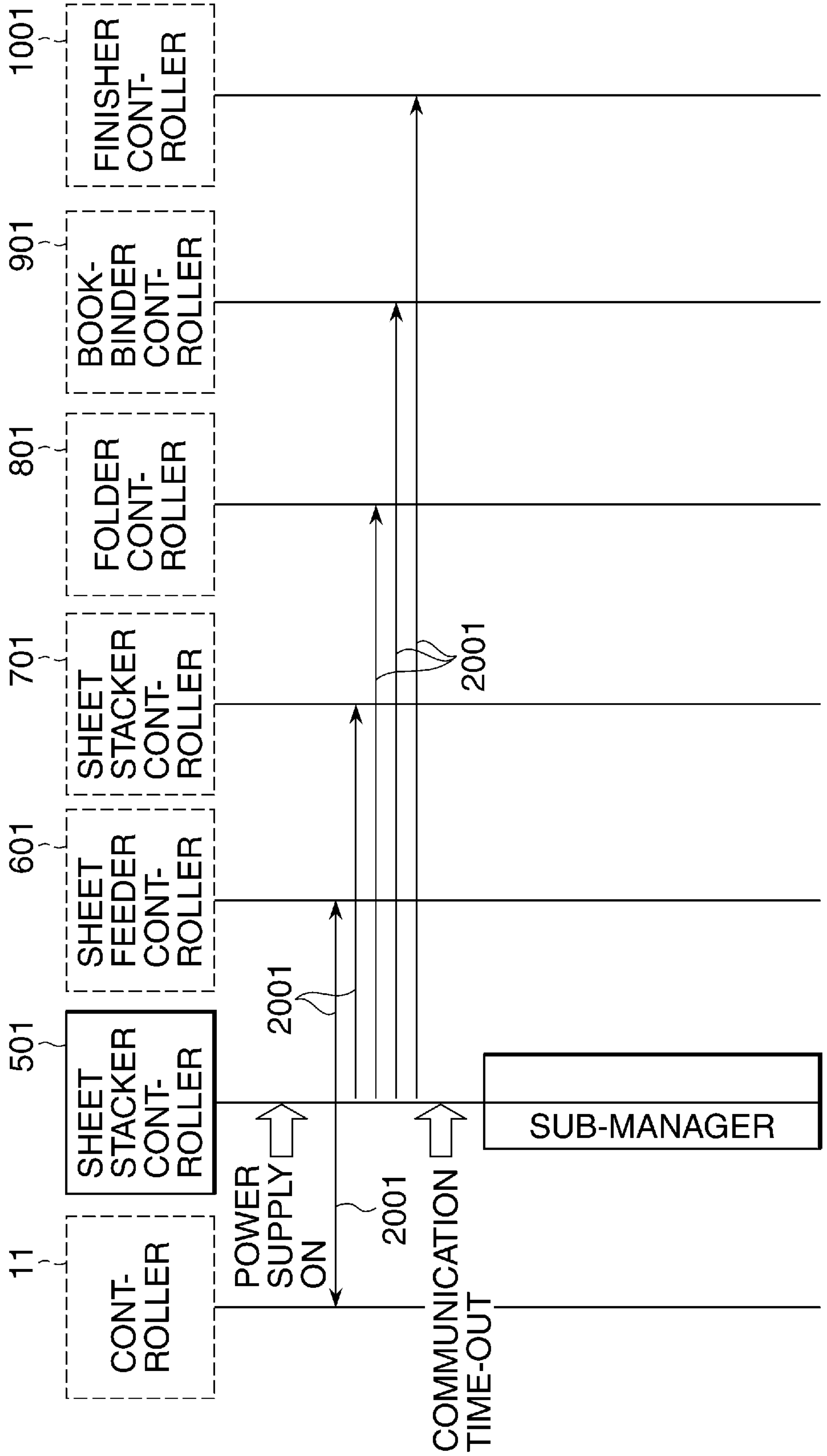
FIG. 16 is a view showing a command sequence for a case where one of the sheet processing apparatuses is first activated.
Figure 17:
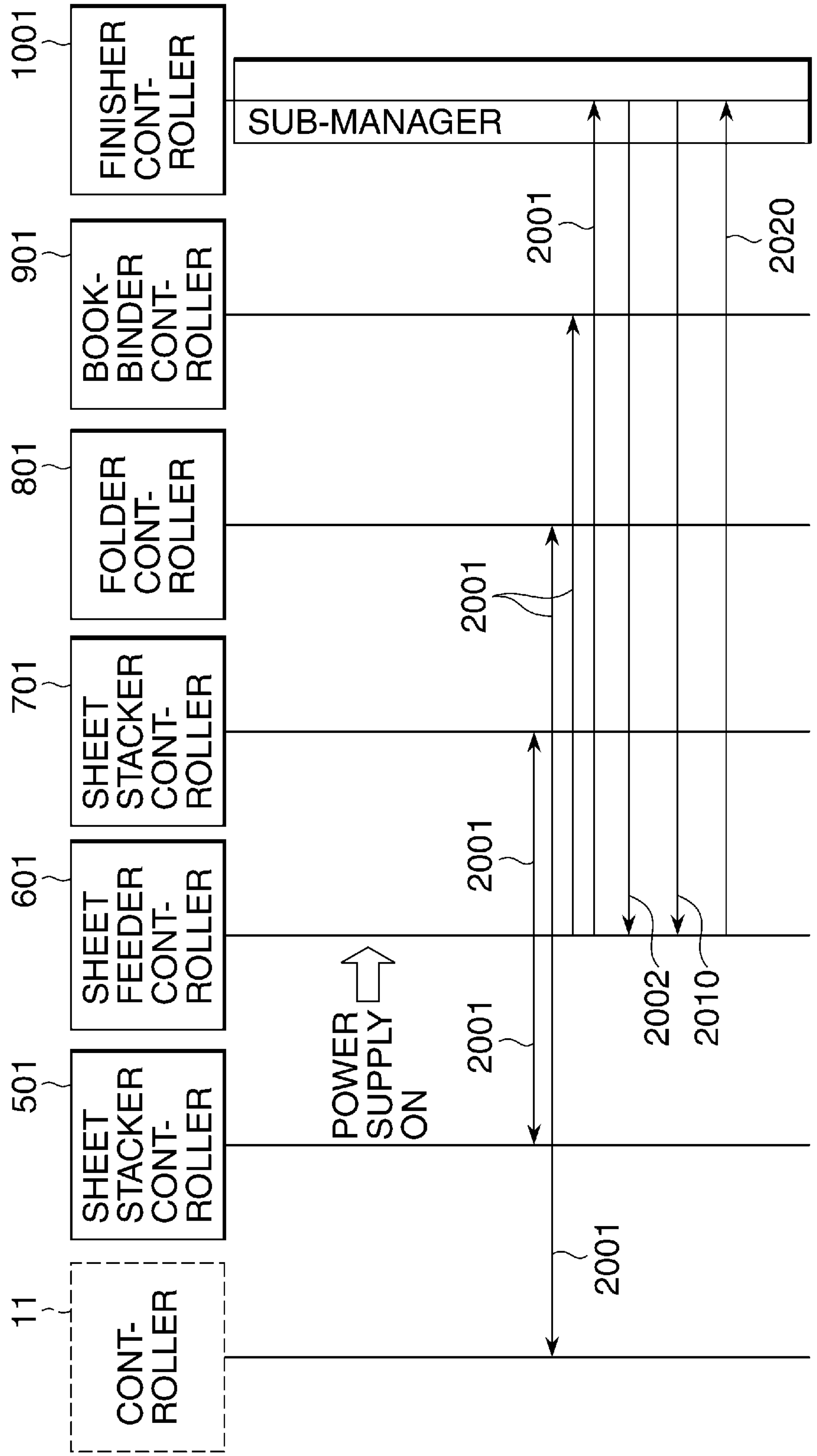
FIG. 17 is a view showing a command sequence for a case where a sub-manager function is not transferred.
Figure 18:
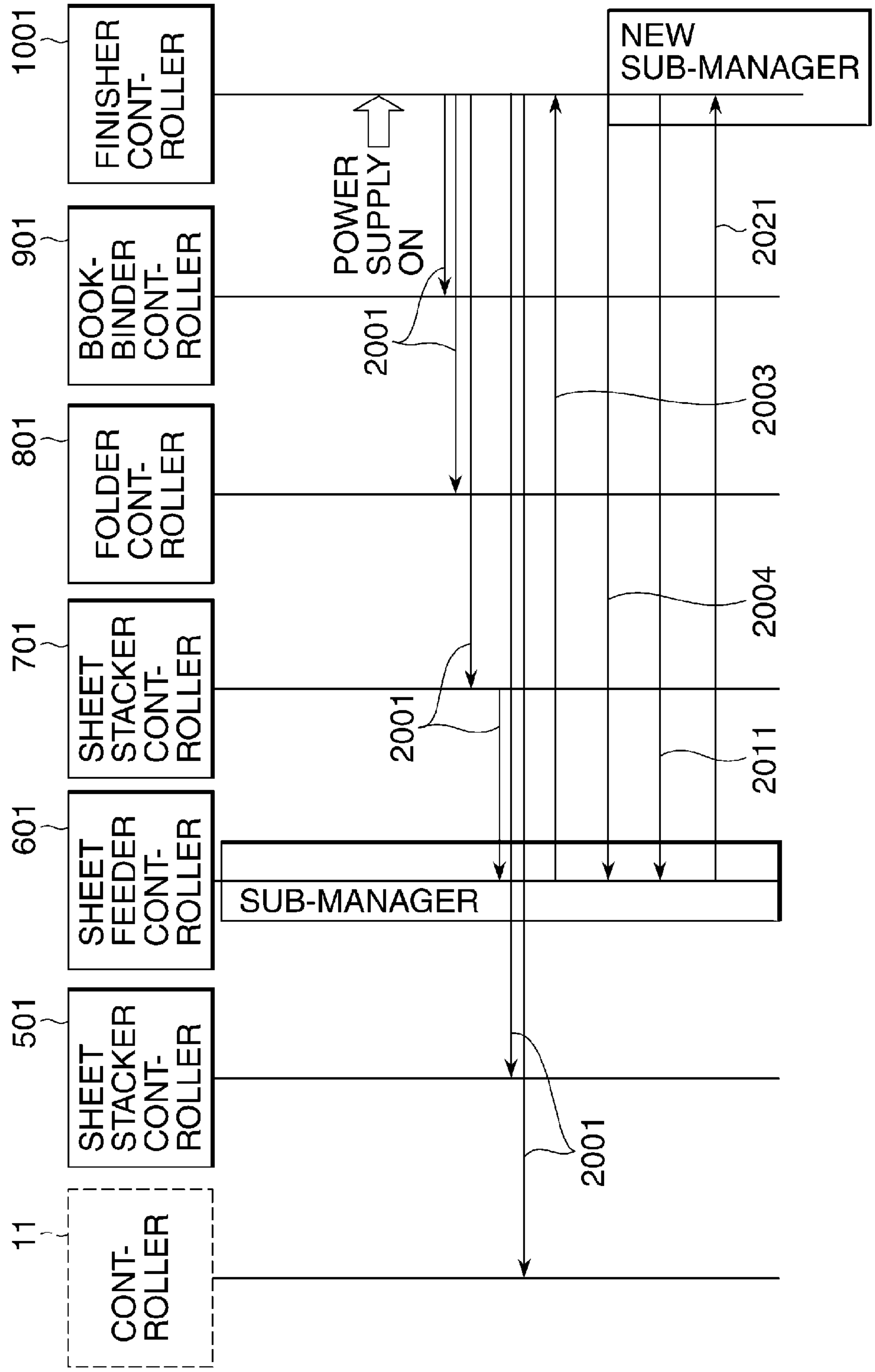
FIG. 18 is a view showing a command sequence for a case where the sub-manager function is transferred.

FIG. 6 to FIGS. 15A and 15B are tables showing example parameters for configuration communication at the turn-on of power supply of an apparatus. The configuration communication parameters are utilized for an initializing operation of the powered-on apparatus. FIGS. 16 to 18 show command sequences. In FIG. 16, there is shown a command sequence for a case where one of the sheet processing apparatuses, e.g., the sheet stacker 500, is first activated. FIG. 17 shows a command sequence for a case where a sub-manager function is not transferred from a current sub-manager to a powered-on apparatus, and FIG. 18 shows a command sequence for a case where the sub-manager function is transferred from a current sub-manager to a powered-on apparatus (new sub-manager). In FIGS. 16 to 18, apparatuses not activated are each shown by a dotted frame.

In a data structure (table) in FIG. 6, data (network connection notification command) 2001 is set, by which a powered-on apparatus notifies other apparatuses that the powered-on apparatus participates in the network. Specifically, a command ID, transmission destination apparatus ID, transmission source apparatus serial ID, and apparatus type ID are set in the data 2001. At the turn-on of the power supply of any of the apparatuses connected to the network, the controller of the powered-on apparatus (e.g., controller 501 in FIG. 16) transmits the data 2001 to the controllers of all the other apparatuses connected to the network. Since the presence/absence of other apparatuses connected to the network is unknown at that time, the transmission destination ID is set to "00" representing that the transmission destination is not specified. Further, the apparatus type ID is set to "00" to enable other apparatus (e.g., the finisher in the example of FIG. 17) acting as a sub-manager, if any, to determine whether or not the sub-manager function should be transferred to the newly connected (powered-on) apparatus.

In a data structure shown in FIG. 7, data (network connection response command) 2002 is set, by which the sub-manager apparatus notifies that the sub-manager apparatus acknowledges the participation of that apparatus in the network from which the data 2001 has been transmitted. Specifically, a command ID, transmission destination apparatus serial ID, transmission source network ID, and transmission destination network ID are set in the data 2002. When recognizing that the apparatus is newly connected to the network (e.g., the sheet feeder in the example of FIG. 17) based on the data 2001, the controller (second control unit) of the sub-manager apparatus (e.g., controller 1001 in FIG. 17) transmits the data 2002 to the newly connected apparatus.

In a data structure shown in FIG. 8, data (sub-manager transfer acceptance request command) 2003 is set, by which the sub-manager requests the apparatus newly connected to the network to accept transfer of sub-manager function from the sub-manager. Specifically, a command ID, a transmission destination apparatus serial ID, transmission source network ID, transmission destination network ID, number of apparatuses connected to sub-system, apparatus type IDs of apparatuses in sub-system, and network IDs of apparatuses in the sub-system are set in the data 2003. The controller of the sub-manager apparatus (e.g., controller 601 in FIG. 18) recognizes the apparatus newly connected to the network (e.g., finisher) based on the data 2001 and transmits the data 2003 to the newly connected apparatus to thereby request the apparatus to accept transfer of sub-manager function from the sub-manager. As described later, if the request is accepted, the sub-manager apparatus transmits the already prepared configuration information 2021 on the sub-system to the newly connected apparatus (new sub-manager apparatus).

In a data structure shown in FIG. 9, data (sub-manager transfer response command) 2004 for accepting the transfer of sub-manager function from the sub-manager is set. Specifically, a command ID, transmission destination network ID, transmission source network ID, and sub-manager transfer result are set in the data 2004. The controller of the apparatus newly connected to the network (e.g., controller 1001 in FIG. 18) transmits the data 2004 to the sub-manager apparatus in response to the data 2003 transmitted from the controller of the sub-manager apparatus (e.g., controller 601 in FIG. 16), thereby accepting the transfer of sub-manager function from the current sub-manager apparatus.

In a data structure shown in FIG. 10, data (configuration information transmission request command) 2010 is set, by which the sub-manager requests each apparatus to transmit configuration information data thereon. Specifically, a command ID, transmission destination network ID, transmission source network ID, and configuration information request designation are set in the data 2010. The controller of the sub-manager apparatus (e.g., controller 1001 in FIG. 17) transmits the data 2010 to each of the apparatuses already connected to the network.

In a data structure shown in FIG. 11, data (sub-system information transmission request command) 2011 is set, by which the previous sub-manager is requested to transmit configuration information data on the sub-system managed by the previous sub-manager. Specifically, a command ID, transmission destination network ID, and transmission source network ID are set in the data 2011. The controller of the sub-manager apparatus (e.g., controller 1001 in FIG. 18) transmits the data 2004, 2011 in succession to the previous sub-manager in response to the command 2003 from the previous sub-manager (e.g., sheet feeder).

In a data structure shown in FIG. 14, data (apparatus configuration information response command) 2020 is set, by which configuration data on the apparatus is notified to the sub-manager. Specifically, a command ID, transmission destination network ID, transmission source network ID, configuration data on the apparatus such as apparatus type and post-processing function are set in the data 2020. In response to the configuration information transmission request command 2010 from the sub-manager apparatus (e.g., finisher), the controller of the apparatus newly connected to the network (e.g., controller 601 in FIG. 17) transmits the data 2020 to the sub-manager apparatus.

In a data structure shown in FIGS. 15A and 15B, data (sub-system configuration information response command) 2021 is set, by which the previous sub-manager notifies configuration information data on the sub-system managed by the previous sub-manager to the new sub-manager. Specifically, a command ID, transmission destination network ID, transmission source network ID, number of apparatuses connected to sub-system, apparatus type ID, configuration data on the sub-system such as apparatus type and post-processing function are set in the data 2021. In response to the data 2004, 2011 transmitted in succession from the new sub-manager apparatus (e.g., finisher), the controller of the previous sub-manager apparatus (e.g., controller 601 in FIG. 18) transmits the data 2021 to the new sub-manager apparatus.

In a data structure shown in FIG. 12, data (network connection notification command) 2101 is set, by which the image forming apparatus 10 notifies other apparatuses that the image forming apparatus 10 participates in the network. As with the above described data 2001, a command ID, transmission destination apparatus ID, transmission source apparatus serial ID, and apparatus type ID are set in the data 2101. At the turn-on of the power supply of the image forming apparatus 10, the controller 11 of the apparatus 10 transmits the data 2101 to all the sheet processing apparatuses connected to the network. As with the data 2001, the transmission destination ID and the apparatus type ID are each set to “00” in the data 2101.

In a data structure shown in FIG. 13, data (network connection response command) 2102 is set. Specifically, a command ID, transmission destination apparatus serial ID, transmission source network ID, transmission destination network ID, number of apparatuses connected to the sub-system, and apparatus type IDs and network IDs of the apparatus in the sub-system are set in the data 2102. The sub-manager apparatus recognizes based on the data 2101 that the image forming apparatus 10 is newly connected to the network, and transmits the data 2102 to the image forming apparatus 10. As with the above-described sub-manager transfer acceptance request command 2003, the number of apparatuses constituting the sub-system, apparatus type IDs and network IDs of these apparatuses are set in the data 2102. If the sub-manager transfer acceptance request 2003 from the sub-manager apparatus is accepted by the image forming apparatus 10, the sub-manager apparatus promptly delivers the already prepared configuration information on the sub-system to the image forming apparatus 10 and cancels the sub-manager setting thereon, whereas the image forming apparatus 10 is set as the new sub-manager.

(Initializing Communication Control Flow)

Figure 19:
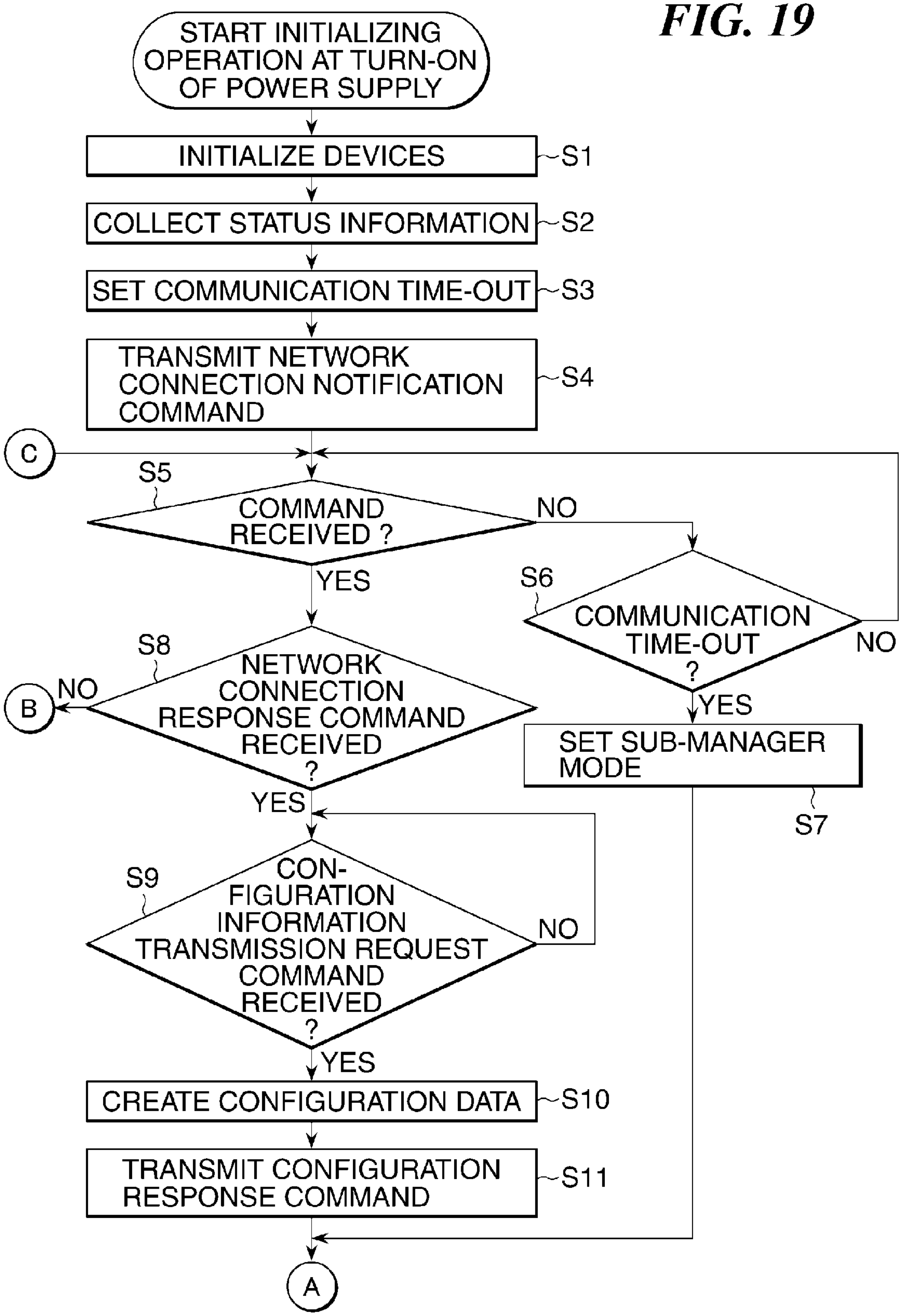
FIG. 19 is a part of a flowchart showing the procedures of an initializing operation performed after the turn-on of power supply to a sheet processing apparatus.
Figure 20:
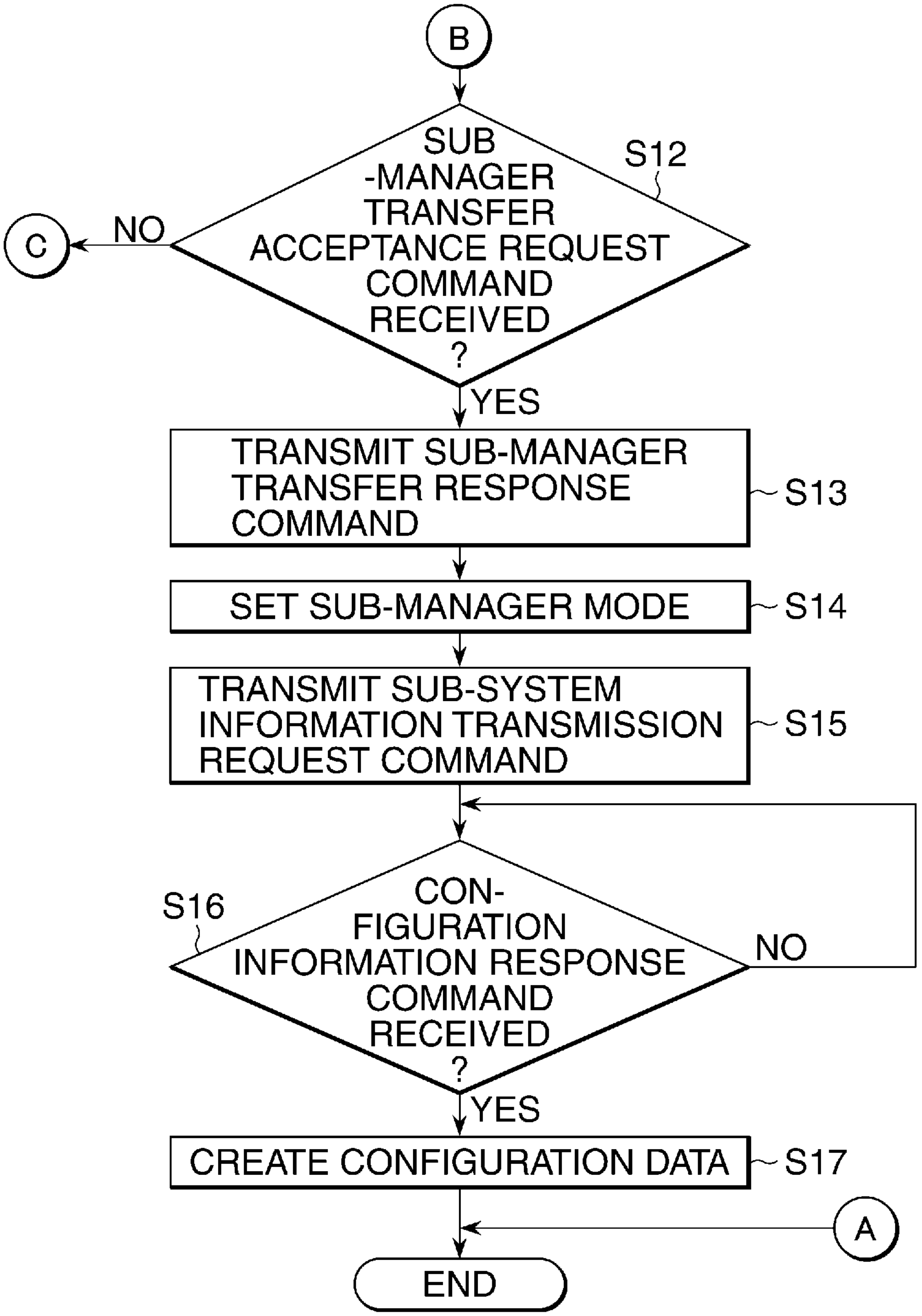
FIG. 20 is the remaining part of the flowchart, which follows the part shown in FIG. 19.

FIGS. 19 and 20 show in flowchart the procedures of an initializing operation of a sheet processing apparatus at the turn-on of power supply thereof. The procedures show an operation flow common to the controllers of sheet processing apparatuses.

When a user turns on the power supply of any of the sheet processing apparatuses (hereinafter the sheet processing apparatus whose power supply is turned on will be referred to as the powered-on apparatus), the controller (CPU) of the powered-on apparatus executes an initializing operation (step S1). In the initializing operation, various devices such as RAM, I/O, motors, clutches, solenoids, sensors, and display LEDs are initialized.

Upon completion of the initializing operation, the controller of the powered-on apparatus collects status information on the powered-on apparatus (step S2). As examples of the status information to be collected, there may be mentioned an open/close state of an open/close section, the presence/absence and amount of sheets on a stack tray, remaining amounts of consumable supplies such as glue or staple needles for post-processing, allowable amounts of punching and trimming waste, a mounted/dismounted state of a removably mounted unit, a mounted unit type, etc.

Next, the controller of the powered-on apparatus sets a timer for detecting a communication time-out (step S3).

Then, the controller of the powered-on apparatus transmits data (network connection notification command) 2001 for notifying the participation of the powered-on apparatus in the network to all the apparatuses connected to the network (step S4).

Subsequently, the controller of the powered-on apparatus determines whether it receives a command (step S5). When determining in step S5 that it does not receive a command, the controller determines whether the timer set in step S3 for detecting a communication time-out has been counted up (step S6).

When determining in step S6 that a communication time-out has not occurred, the controller of the powered-on apparatus executes the processing in step S5 again. On the other hand, when determining an occurrence of communication time-out in step S6, the controller determines that there is no apparatus connected to the network, and sets a sub-manager mode in which the powered-on apparatus functions as the sub-manager (step S7), whereupon the initializing operation is completed. The apparatus for which the sub-manager mode is set corresponds to the sub-manager apparatus.

When determining the reception of command in step S5, the controller of the powered-on apparatus determines whether the received command is the network connection response command 2002 indicating that the participation of the powered-on apparatus in the network has been acknowledged by the sub-manager apparatus (step S8).

When determining the reception of the network connection response command 2002 in step S8, the controller waits for reception of a configuration information transmission request command 2010 from the sub-manager apparatus (step S9).

If it is determined in step S9 that the configuration information transmission request command 2010 is received, the controller creates configuration data on the powered-on apparatus and a configuration information response command 2020 (step S10), and transmits the created configuration information response command 2020 to the sub-manager (step S11). Subsequently, the controller completes the initializing operation.

If it is determined in step S8 that the network connection response data 2002 is not received, the controller determines whether the received command is the sub-manager transfer acceptance request command 2003 transmitted from the sub-manager apparatus (step S12).

If it is determined that the sub-manager transfer acceptance request command 2003 is received, the controller of the powered-on apparatus transmits the sub-manager transfer response command 2004, i.e., a response to the sub-manager transfer acceptance request, to the sub-manager apparatus (step S13).

Next, the controller of the powered-on apparatus sets the sub-manager mode in which the powered-on apparatus is set as the sub-manager (step S14). Specifically, the controller writes data (sub-manager flag) into the built-in RAM and executes a sub-manager program stored in advance in the ROM.

Next, the controller transmits the sub-system information transmission request command 2011 to the previous sub-manager apparatus in order to acquire therefrom configuration information on all the apparatuses that participate in the network (configuration information on the sub-system) (step S15).

Then the controller waits for reception of the sub-system configuration information response command 2021 from the previous sub-manager, which includes configuration information data on the sub-system (step S16). When determining the reception of sub-system configuration information response command 2021, the controller acting as the sub-manager creates configuration data on the sub-system constituted by all the sheet processing apparatuses connected to the network (step S17), and then completes the initializing operation. As described later, the configuration data on the sub-system created in step S17 is stored into the ROM of the sub-manager apparatus and notified to the controller 11 when the image forming apparatus 10 is activated. In a case that the sub-manager function is transferred to other sheet processing apparatus, the data is transmitted to the sheet processing apparatus acting as the new sub-manager.

Figure 21:
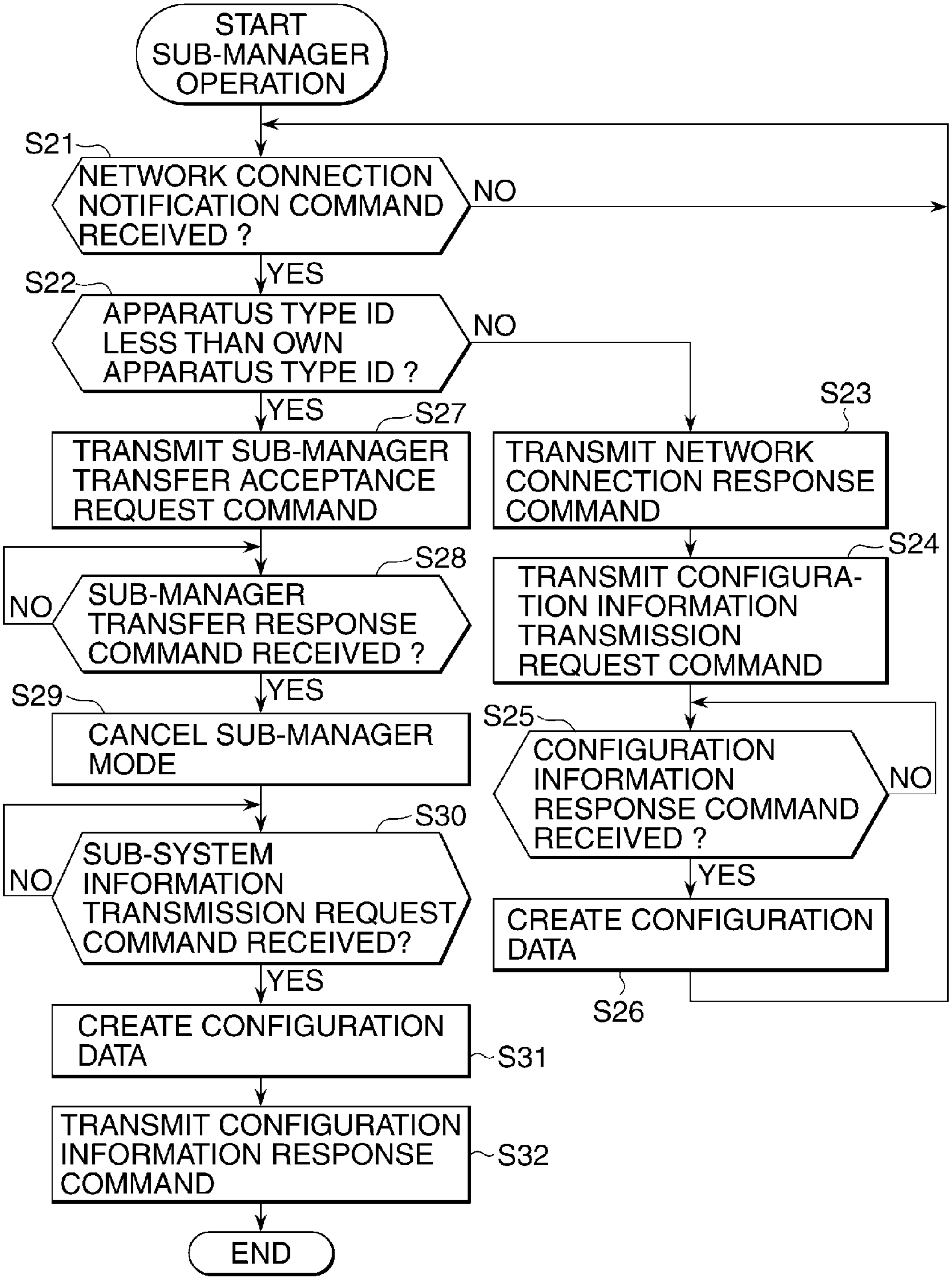
FIG. 21 is a flowchart showing the procedures of operation of one sheet processing apparatus functioning as the sub-manager.

FIG. 21 shows in flowchart the procedures of operation of one sheet processing apparatus functioning as the sub-manager. The procedures indicate an operation flow common to sheet processing apparatuses for which the sub-manager mode can be set.

The controller (CPU) of the apparatus for which the sub-manager mode is set (sub-manager apparatus) determines whether it receives data (network connection notification command) 2001 for notifying the participation in the network (step S21). The processing in step S21 corresponds to an apparatus determination unit. Until receiving the data 2001, the controller of the sub-manager apparatus (hereinafter referred to as the sub-manager controller) repeatedly executes the processing in step S21.

When determining the reception of data 2001, the sub-manager controller determines whether an apparatus type ID in the received data 2001 is less than its own apparatus type ID (step S22). As described later, if the apparatus type ID in the received data is less than the own apparatus type ID, it is indicated that the sub-manager apparatus is requested to transfer its sub-manager function to the apparatus from which the data 2001 has been transmitted. The processing in step S22 corresponds to a transfer determination unit.

If it is determined that the apparatus type ID in the received data 2001 is equal to or greater than the own apparatus type ID, the sub-manager controller transmits the network connection response command 2002 to the apparatus from which the data 2001 has been transmitted (step S23).

Next, the sub-manager controller transmits the configuration information transmission request command 2010 to thereby request the apparatus from which the network connection notification command has been received in step S21, i.e., the apparatus newly connected to the network, to transmit configuration information data on the apparatus (step S24).

Then the sub-manager controller waits for reception of the configuration information response command 2020 (step S25). When determining the reception of command 2020, the sub-manager controller merges configuration data on the newly connected apparatus with the already created configuration data on the sub-system (step S26), and executes step S21 again. As described later, the configuration data on the sub-system created in step S26 is stored into the ROM of the sub-manager apparatus and notified to the controller 11 when the image forming apparatus 10 is activated. If the sub-manager function is to be transferred to other sheet processing apparatus, the data is transmitted to the other apparatus functioning as the new sub-manager apparatus.

On the other hand, if it is determined in step S22 that the apparatus type ID in the received data 2001 is less than the own apparatus type ID, the sub-manager controller transmits sub-manager transfer acceptance request command 2003 to the apparatus from which the data 2001 has been transmitted, thereby requesting the apparatus to accept the transfer of sub-manager function from the sub-manager apparatus thereto (step S27). It should be noted that the sub-manager transfer acceptance request command 2003 in step S27 and the network connection response command 2002 in step S23 are particular data transmitted to a sheet processing apparatus newly connected to the communication network.

Then, the sub-manager controller waits for reception of the sub-manager transfer response command 2004, which is a response to the sub-manager transfer acceptance request command 2003 (step S28).

When determining reception of the sub-manager transfer response data 2004, the sub-manager controller cancels the sub-manager mode (step S29). The controller of the apparatus for which the sub-manager mode has been canceled waits for reception of the sub-system information transmission request command 2011 from the new sub-manager apparatus (step S30).

When receiving the sub-system information transmission request command 2011, the controller of the apparatus for which the sub-manager mode has been canceled creates configuration data (step S31). The configuration data includes configuration information on all the apparatuses participating in the network (configuration information on the sub-system) and managed by the controller of the apparatus for which the sub-manager mode has been cancelled.

The controller of the apparatus for which the sub-manager mode has been canceled transmits to the new sub-manager the sub-system configuration information response command 2021 (step S32), and completes a series of operations to be performed by the sub-manager.

Subsequently, the apparatus for which the sub-manager mode has been canceled notifies the new sub-manager apparatus, e.g., the image forming apparatus 10 newly connected to the network, of the network connection response data 2102 including the configuration data on the sub-system.

Figure 22:
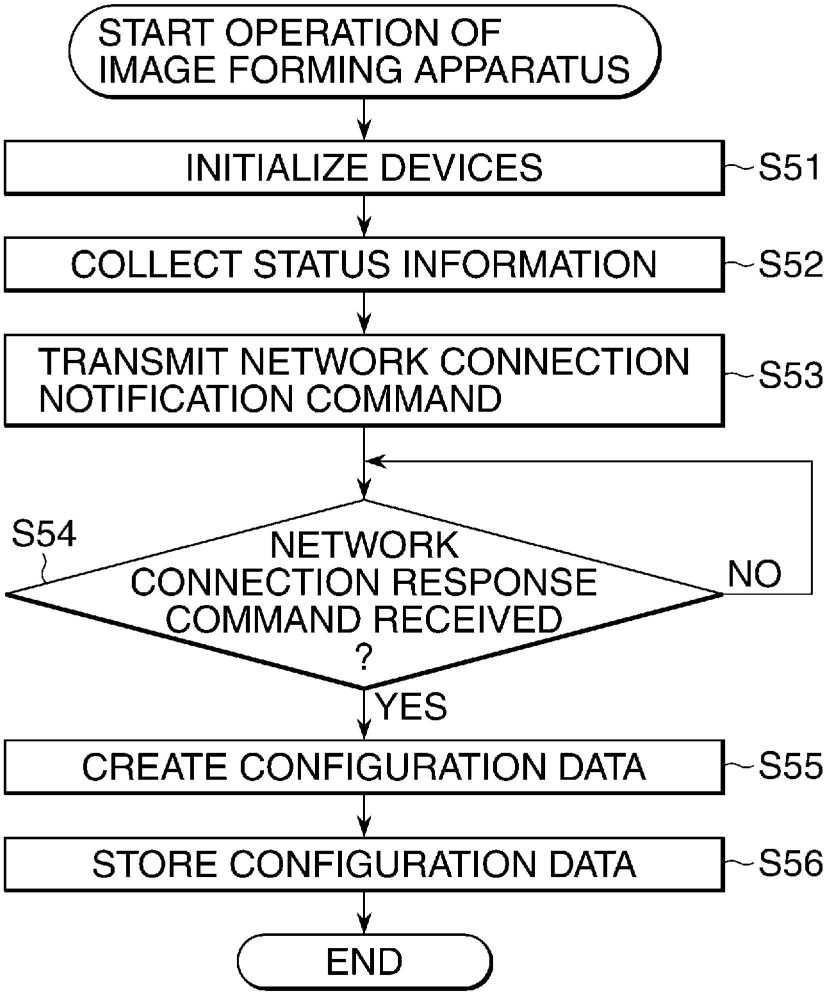
FIG. 22 is a flowchart showing the procedure of an initializing operation performed at the turn-on of power supply to the image forming apparatus.

FIG. 22 shows in flowchart the procedures of an initializing operation of the image forming apparatus 10 at the turn-on of the power supply thereof. When the power supply (first power supply) of the image forming apparatus 10 is turned on by the user, the controller 11 (CPU 153) of the apparatus 10 performs an initializing operation (step S51) to initialize various devices such as RAM, I/O, clutches, solenoids, sensors, and display LEDs.

Upon completion of the initializing operation, the controller 11 collects status information on the image forming apparatus 10 (step S52).

Next, the controller 11 transmits a network connection notification command 2101 to all the sheet processing apparatuses connected to the network (step S53), and waits for reception of the network connection response command 2102 from the sub-manager apparatus (step S54). The sub-manager apparatus transmits to the image forming apparatus 10 the network connection response command 2102 to promptly deliver the already prepared configuration information on the sub-system to the image forming apparatus 10. The response command 2102 includes data representing the number of apparatuses connected to the sub-system and the apparatus type IDs and network IDs of the apparatuses of the sub-system as previously described, and may further include detailed configuration data on the apparatuses of the sub-system as with the sub-system configuration information response command 2021. If the command 2102 does not include the detailed configuration data on the apparatuses of the sub-system, the controller 11 may add such data after being activated.

When receiving the network connection response command 2102, the controller 11 creates configuration data on the image forming system 1. Specifically, the controller 11 merges configuration data on the image forming apparatus (own apparatus) with the received, already created configuration data on the sub-system to form one data, thereby creating configuration data on the image forming system 1 (step S55), and stores the created configuration data into the RAM 152 (step S56). Subsequently, the controller 11 completes the processing at the time of being activated.

In the image forming system 1 of this embodiment, the image forming apparatus 10 and sheet processing apparatuses (post-processing apparatuses) are connected to one another via the communication cable 303 (communication network), as described above. When any of the sheet processing apparatuses is activated prior to the activation of the image forming apparatus 10, the controller (second control unit) of the sheet processing apparatus, which is the sub-manager, configures the sub-system consisting of sheet processing apparatuses activated or connected to the communication cable 303. Then, the sub-manager apparatus creates configuration data on the sheet processing apparatuses of the sub-system. When recognizing that the image forming apparatus 10 is newly connected to the network, the sub-manager apparatus notifies the image forming apparatus 10 of the already created configuration data on the sub-system. Based on the notified configuration data, the image forming apparatus controller 11 (CPU 153) creates configuration data on the image forming system 1 and stores it into the RAM 152.

With the image forming system 1 of this embodiment, it is possible to shorten the time required to process configuration information on the system by communication at activation and shorten communication time therefor, whereby the image forming system can rapidly be activated and the user's waiting time can be shortened. This arrangement is effective for a case where the configuration is frequently changed, and able to deal with detailed configuration information on the sheet processing apparatuses (post-processing apparatuses).

It should be noted that this invention is not limited in construction to the above described embodiment, but is applicable to any construction having functions defined in claims appended herein or capable of achieving the functions of the embodiment.

For example, the sub-manager transfer acceptance request command is transmitted in the embodiment in a case that the apparatus type ID of a newly connected sheet processing apparatus is less than that of the own apparatus, but may be transmitted when the apparatus type ID is greater than that of the own apparatus in a case that the apparatus type IDs are applied in the reverse order from that of the embodiment.

The image forming apparatus can be implemented by not only a printing apparatus but also a facsimile machine having a printing function or a multifunction peripheral (MFP) having a printing function, copying function, scanner function, etc.

The image forming apparatus may be implemented by either a monochrome or color image forming apparatus. As the color image forming apparatus, there may be mentioned, e.g., an apparatus having an intermediate transfer member and configured to sequentially transfer color toner images onto the intermediate transfer member one upon another and collectively transfer the toner images carried on the intermediate transfer member onto a recording medium. The transfer system is not limited thereto, but the image forming apparatus may be configured to have photosensitive drums for YMCK colors and sequentially transfer color toner images carried on the drums onto a recording medium.

In the embodiment, an electrophotographic image forming apparatus has been described by way of example, however, this invention is not limited thereto, but is applicable to printing methods such as an ink jet method, thermal transfer method, thermography method, electrostatic method, and discharge breakdown method.

The image forming apparatus may be coupled with various options (sheet processing apparatuses) for function expansion as desired by the user. This invention is applicable to any image forming system in which whatever sheet processing apparatuses are coupled to the image forming apparatus. As the sheet processing apparatuses, there may be mentioned a large capacity paper deck capable of supplying and conveying a large quantity of sheets, a stapler for stitching sheets formed with images, a folder for folding sheets, a sorter for sorting sheets, a punching machine for forming stitching holes in sheets, an automatic double-sided conveyance machine for forming images on both sides of a sheet, an inserter for inserting a sheet between sheets, a cutting machine for simultaneously cutting a large amount of sheets, an automatic sheet feeder for automatically feeding a sheet to a scanner, and a fixing post-processing apparatus in which an output image is processed with high quality.

Sheets are not limited to particular ones but may be paper medium, OHP sheet, heavy paper, etc.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-198558, filed Jul. 31, 2008, which is hereby incorporated by reference herein in its entirety.

What is claimed is:

1. An image forming system comprising:

an image forming apparatus configured to form an image on a sheet; and first and second sheet processing apparatuses each configured to process a sheet on which an image is formed by said image forming apparatus, wherein said first sheet processing apparatus includes:

a communication unit configured to communicate with said image forming apparatus and said second sheet processing apparatus; and a control unit configured to:

determine whether or not said first sheet processing apparatus transmits configuration information of said first and second sheet processing apparatuses to said image forming apparatus based on the communication result with said second sheet processing apparatus;

collect, when said control unit determines that said first sheet processing apparatus transmits the configuration information of said first and second sheet processing apparatuses to said image forming apparatus, the configuration information of said second sheet processing apparatus; and causes, when said control unit determines said first sheet processing apparatus does not transmit the configuration information of said first and second sheet processing apparatuses to said image forming apparatus, said communication unit to transmit the configuration information of said first sheet processing apparatus to said second sheet processing apparatus.

2. The image forming system according to claim 1, wherein:

said first and second sheet processing apparatuses each have an independent power supply, and said communication unit communicates with said second sheet processing apparatus in response to turn-on of the independent power supply of said first sheet processing apparatus.

3. The image forming system according to claim 1, wherein said control unit acquires inherent information of said second sheet processing apparatus based on the communication result with said second sheet processing apparatus, and determines whether or not said first sheet processing apparatus transmits the configuration information of said first and second sheet apparatuses to said image forming apparatus based on the inherent information of said second sheet processing apparatus.

4. The image forming system according to claim 1, wherein:

said image forming apparatus has a controller that performs an initializing operation in response to turn-on, and transmits a command to said first and second sheet processing apparatuses after having performed the initializing operation, and said control unit causes, when said control unit determines that said first sheet processing apparatus transmits the configuration information of said first and second sheet apparatuses to said image forming apparatus, said communication unit to transmit the configuration information of said first and second sheet processing apparatus to said image forming apparatus in response to the reception of the command.

5. The image forming system according to claim 1, wherein said control unit determines, when said first sheet processing apparatus fails to communicate with said second sheet processing apparatus, that said first sheet processing apparatus transmits the configuration information of said first and second sheet apparatuses to said image forming apparatus.

6. A sheet processing apparatus that is connected to another sheet processing apparatus and an image forming apparatus, the sheet processing apparatus comprising:

a communication unit configured to communicate with said image forming apparatus and said another sheet processing apparatus; and a control unit configured to:

determine whether or not said sheet processing apparatus transmits configuration information of said sheet processing apparatus and said another sheet processing apparatus to said image forming apparatus based on the communication result with said another sheet processing apparatus;

collect, when said control unit determines that said sheet processing apparatus transmit the configuration information of said sheet processing apparatus and said another sheet processing apparatus to said image forming apparatus, the configuration information of said another sheet processing apparatus; and causes, when said control unit determines that said sheet processing apparatus does not transmit the configuration information of said sheet processing apparatus and said another processing apparatus to the image forming apparatus, said communication unit to transmit the configuration information of said sheet processing apparatus to said another processing apparatus.

7. The sheet processing apparatus according to claim 6, wherein:

said sheet processing apparatus and said another sheet processing apparatus each have an independent power supply, and said communication unit communicates with said another sheet processing apparatus in response to turn-on of the independent power supply of said sheet processing apparatus.

8. The sheet processing apparatus according to claim 6, wherein said control unit acquires inherent information of said another sheet processing apparatus based on the communication result with said another sheet processing apparatus, and determines whether or not said sheet processing apparatus transmits the configuration information of said sheet processing apparatus and said another sheet processing apparatus to said image forming apparatus based on the inherent information of said another sheet processing apparatus.

9. The sheet processing apparatus according to claim 6, wherein said control unit determines, when said sheet processing apparatus fails to communicate with said another sheet processing apparatus, that said sheet processing apparatus transmits the configuration information of said sheet processing apparatus and said another sheet processing apparatus to said image forming apparatus.

* * * * *